INVENTOR
BRUCE FLAGGE

United States Patent Office

3,503,251
Patented Mar. 31, 1970

3,503,251
VIBRATING STRUCTURE DISPLACEMENT MEASURING INSTRUMENT
Bruce Flagge, Yorktown, Va., assignor to the United States of America as represented by the Administrator of the National Aeronautics and Space Administration
Filed Sept. 26, 1966, Ser. No. 582,171
Int. Cl. G01r 9/04
U.S. Cl. 73—71.4    6 Claims

ABSTRACT OF THE DISCLOSURE

A noncontacting transducer coupled to a servo motor for moving it up or down over a vibrating structure as the transducer is moved along the structure to measure virbation deflection. The initial height of the transducer above the structure is set by manually adjusting an offset voltage which is added to a voltage generated by the transducer to produce a zero voltage at the input of the servo motor. Any change in height of the transducer will result in an error voltage at the input of the servo motor which will cause it to reposition the transducer to its initial height. The output of the transducer is indicative of the vibration of the structure.

---

The invention described herein was made by an employee of the United States Government and may be manufactured and used by or for the Government for governmental purposes without the payment of any royalties thereon or therefore.

The invention relates generally to a vibrating structure displacement measuring instrument and more specifically concerns an instrument, using a nonconacting transducer, for automatically measuring the vibration amplitudes along the span of a vibrating structure of irregular contour.

Many structural research investigations require the measurement of displacement amplitudes. Increased use of fragile and complicated models has made this measurement costly and in some cases impossible. Noncontacting transducers have succeeded in providing a displacement measuring method that does not alter the characteristics of the structure, but their use presents other problems. The displacement sensitivity of these noncontacting transducers is dependent upon the distance between the transducer and the structure, and the useful range is limited to about $\frac{1}{10}$ an inch. Constant transducer sensitivity in the past has been achieved with manual adjustment or profile guides of the structure to maintain a constant average distance between the transducer and the structure. These profile guides are expensive and in some cases impossible to fabricate to conform to irregular and unpredictable deformation of some vibrating structures.

It is therefore an object of this invention to provide a noncontacting vibrating structure displacement measuring instrument which does not require the use of profile guides or manual adjustments.

Another object of this invention is to provide a noncontacting vibrating structure displacement measuring device which has a constant sensitivity.

A further object of this invention is to provide a noncontacting vibrating structure displacement measuring device which is not limited in the amplitudes of the vibrations measured.

Still another object of this invention is to provide a vibrating structure displacement measuring device which also gives phase information.

The invention consists of a noncontacting transducer physically connected to a servo motor, which is moved along and over an excited structure to measure vibration deflection. The initial height of the transducer above a fixed point on the static test surface is set by manually adjusting a DC voltage offset which is added to the DC voltage generated by the transducer to produce a zero voltage at the input of an operational amplifier. Any change in height of the transducer will result in a DC voltage at the input of the operational amplifier which will cause the servo motor to reposition the transducer to its initial height. The transducer will thus be constrained to follow the contour of the test structure. The AC voltage output from the transducer, which is an analog of the vibration amplitude of the test structure at the point of measurement, is passed to a convenient readout device.

Other objects and advantages of this invention will further become apparent hereinafter and in the drawings, in which.

Figure 1:
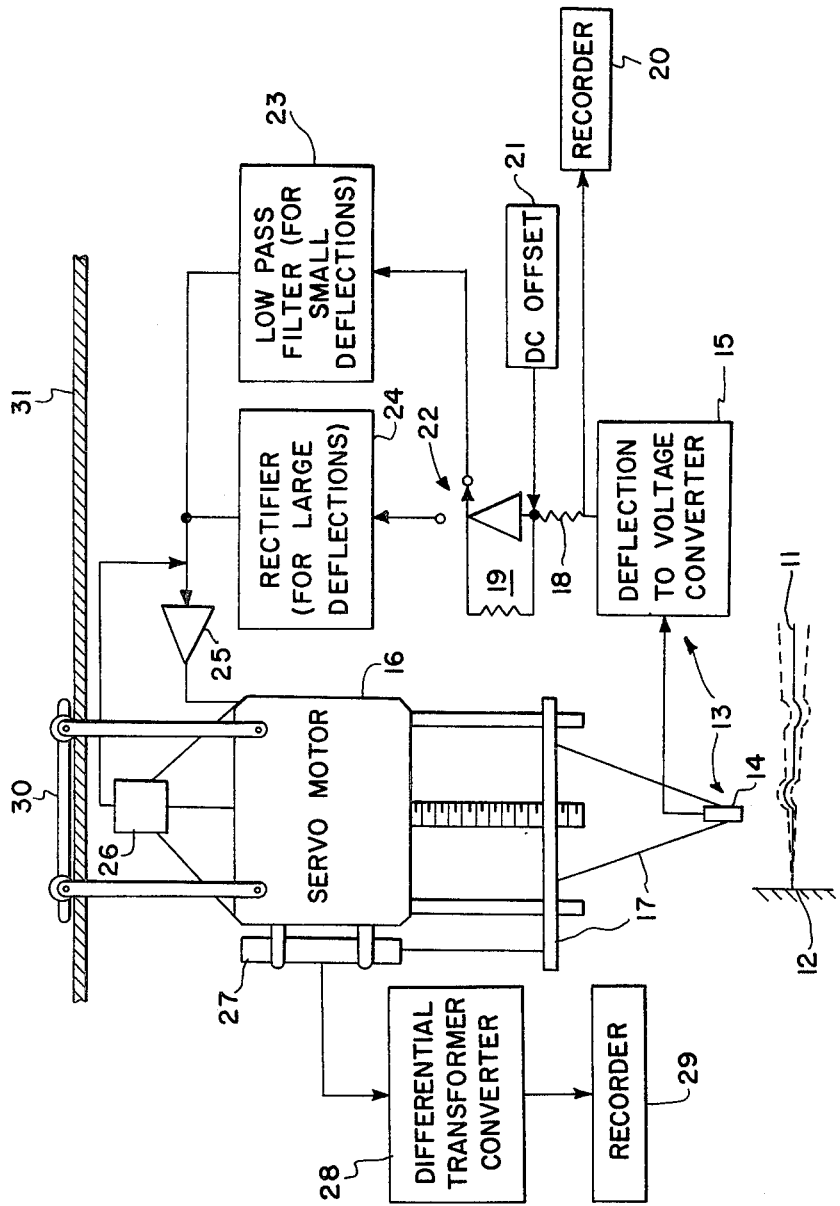
FIG. 1 is a pictorial and block diagram of one embodiment of the invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in FIG. 1 of the drawings, the number 11 designates a vibrating structure of irregular contour with one of its ends attached to a fixed body 12. Noncontacting transducer instrumentation 13, consisting of a transducer 14 and a deflection to voltage converter 15, has its transducer positioned above the vibrating structure 11. Noncontacting transducer instrumentation 13 produces a voltage proportional to the distance between the vibrating structure 11 and the transducer 14. Noncontacting transducer instrumentation components are well known and commercially available, and will therefore not be disclosed in detail in this specification. Transducer 14 is attached to a servo motor 16 by any suitable means 17 so that the position of the shaft of servo motor 16 determines the distance between transducer 14 and vibrating structure 11. Servo motor 16 is supported by a transporting carriage 30 which can be moved on a track 31. When transporting carriage 30 moves on track 31, transducer 14 moves along vibrating structure 11. The output from noncontacting transducer instrumentation 13 is recorded by a suitable recorder 20 and is connected through an isolation resistor 18 to an operational amplifier 19. Also applied to the input of operational amplifier 19 is an adjustable DC offset voltage 21. The voltage produced by DC offset 21 is negative with respect to the voltage produced by transducer instrumentation 13 so that the DC voltage at the input of amplifier 19 will always be approximately zero. The output of operational amplifier 19 is connected to a two-position selector switch 22. For one position of selector switch 22 the output of operational amplifier 19 is connected to a low-pass filter 23 and for the other position amplifier 19 is connected to a rectifier filter 24. The outputs of low-pass filter 23 and rectifier filter 24 are connected to servo motor 16 through a servo amplifier 25. Connected to the shaft of servo motor 16 is a tachometer 26 which generates a rate dependent voltage that is fed back to the input of servo amplifier 25. Also connected to the shaft of servo motor 16 by suitable means 17 is a differential transformer 27 which produces a voltage that identifies the position of the shaft of servo motor 16. This voltage from differential transformer 27 is applied to a differential transformer converter 28 to convert the voltage to a usable DC form which is recorded on a suitable recorder 29.

The voltage generated by differential transformer 27 could be generated by other devices such as a potentiometer with its slider connected to the shaft of servo motor 16 by the suitable means 17 without departing from this invention.

In the operation of the instrument in FIG. 1, transducer 14 is placed a certain distance from the vibrating structure 11. This distance is selected so that the transducer instrumentation 13 will operate on the linear portion of its voltage versus deflection curve. The DC offset 21 is adjusted so that it produces a DC voltage which is equal but opposite to the voltage produced by transducer instrumentation 13 for this selected distance. Transporting carriage 30 is then moved along track 31 so that transducer 14 is moved along the contour of vibrating structure 11. This movement of transporting carriage 30 can either be a continuous movement or it can be a movement in steps. The only requirement is that this movement of transporting carriage 30 be correlated with the output produced by transducer instrumentation 13. For small deflections of structure 11 (1/10 of an inch or less) selector switch 22 is positioned such that the output of operational amplifier 19 is applied to low-pass filter 23. The output of transducer instrumentation 13 is applied through isolation resistor 18 to operational amplifier 19. Prior to being applied to operational amplifier 19 the DC voltage produced by DC offset 21 is combined with the output of transducer instrumentation 13 such that it opposes this voltage and therefore subtracts from it. Any difference in the DC component of the voltage produced by transducer instrumentation 13 and that produced by DC offset 21 is applied through low-pass filter 23 and servo amplifier 25 to servo motor 16 which repositions transducer 14. Hence transducer 14 always remains the same average distance from vibrating structure 11. Low-pass filter 23 filters out the AC voltage generated by transducer instrumentation 13. The output of transducer instrumentation 13 is recorded by recorder 20 thus giving an indication of the vibration deflections of structure 11. It can therefore be readily seen that if the movement of transporting carriage 20 is correlated with the recording made by recorder 20, the vibrations of structure 11 can be determined over any reasonable contour. The rate feedback voltage generated by tachometer 26 suppresses oscillations in the servo controlled system.

For large vibration amplitudes of vibrating structure 11 (1/10 of an inch to two inches) or when the structure 11 is still, the selector switch 22 is positioned so that the output of operational amplifier 19 is applied to rectifier filter 24. A useful analog of displacement is no longer available at the output of transducer instrumentation 13; however, an output obtained from differential transformer 27 and recorded on recorder 29 is a measure of the peak vibration plus the contour irregularities of structure 11. When the structure is still, recorder 29 will record only the contour of structure 11. In making a measurement of these larger vibrations two consecutive sweeps of the structure, one while stationary and one while vibrating, are plotted. The difference in these two plots is proportional to the vibration deflections.

Figure 2:
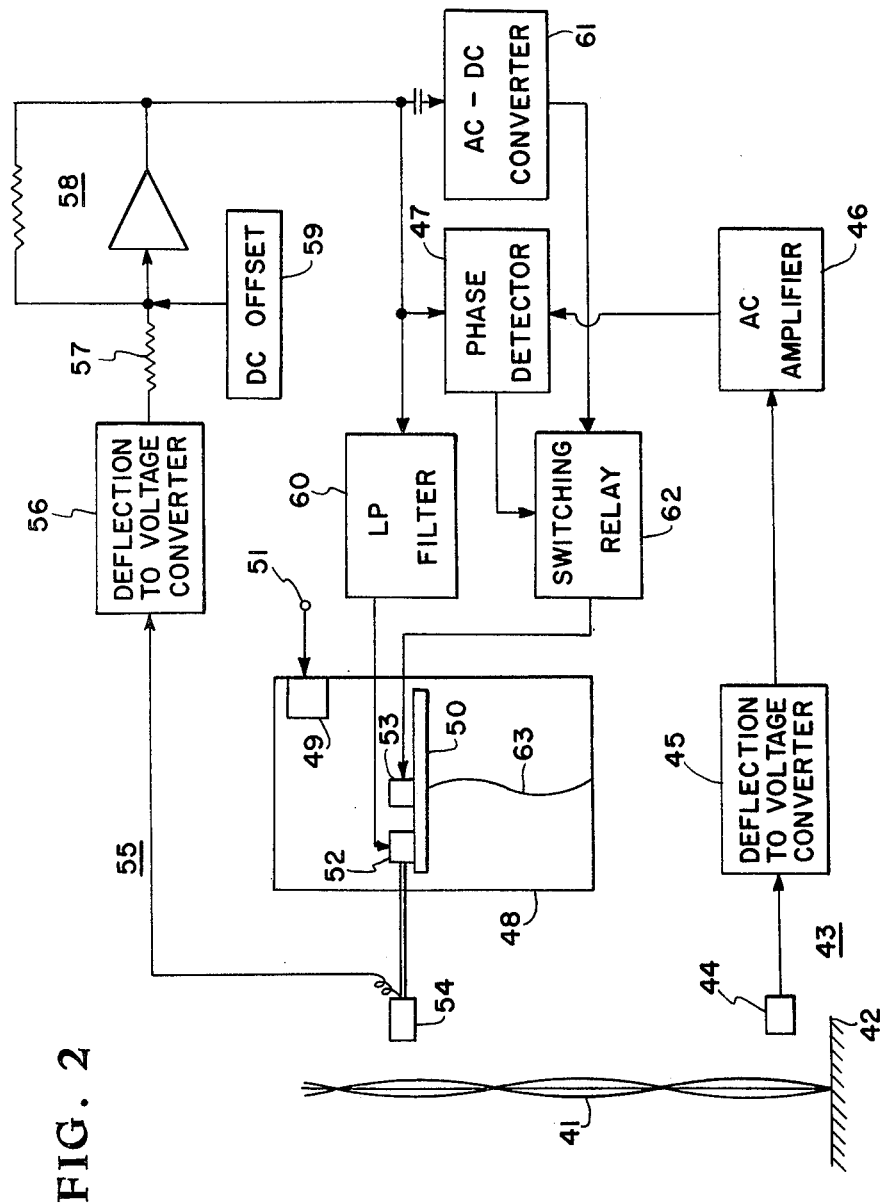
FIG. 2 is a block diagram of another embodiment of the invention.

The embodiment of the invention disclosed in FIG. 2 is used to measure the deflection of the vibrating structure 41 which is attached to a fixed body 42. Vibrating structure 41 can assume several different exitation modes. Noncontacting transducer instrumentation 43 having a transducer 44 and deflection to voltage converter 45 has its transducer positioned a certain distance from vibrating structure 41. This position remains fixed and thereby provides a reference voltage at the output of transducer instrumentation 43. This output is applied through an AC amplifier 46 to a phase detector 47. The embodiment of the invention (FIG. 2) utilizes a conventional X—Y$_1$—Y$_2$ recorder 48. This recorder has a motor 49 which positions the carriage 50 in the X direction of the recorder. Motor 49 is supplied by a voltage to terminal 51. The voltage applied to terminal 51 is a voltage ramp which will move carriage 50 at a constant speed in the X direction of the recorder. Recorder 48 has two Y motors, 52 and 53, which are mounted on carriage 50. Motor 52 is attached to a transducer 54 which is a part of noncontacting transducer instrumentation 55 consisting of transducer 54 and deflection to voltage converter 56. The output of converter 56 is applied through an isolation resistor 57 to an operational amplifier 58. A DC offset 59 is also connected to the input of operational amplifier 58. The output of operational amplifier 58 is applied through a low-pass filter 60 to motor 52. The output of operational amplifier 58 is also applied to an AC-to-DC converter 61 and to phase detector 47. The output of phase detector 47 controls switching relay 62 to either apply the output of DC converter 61 directly to motor 53 or invert it before it is applied to motor 53. Motor 52 controls the distance of transducer 54 from vibrating structure 41 and motor 53 is connected to a recording pen so that as carriage 50 moves in the X direction of the recorder the pin will make a recording 63 on the recorder. This recording 63 is a recording of the deflection of structure 41. Phase detector 47 detects the phase of the voltage at the output of operational amplifier 58 with respect to the phase of the voltage at the output of amplifier 46. If this phase is positive, switching relay 62 is activated such that the DC voltage at the output of converter 61 is applied directly to motor 53; if this phase is negative then switching relay 62 is actuated to invert the output of converter 61 before it is applied to motor 53. Phase detector 47 can be a conventional ring demodulator with a meter relay control or rectifier control, and switching relay 62 can be a conventional DPDT relay.

In the operation of the instrument disclosed in FIG. 2 transducers 44 and 54 are placed the desired distance from vibrating structure 41. The DC offset 59 is adjusted so that transducer instrumentation 55 responds linearly to the deflection. A voltage ramp is then applied to terminal 51 which causes motor 49 to move carriage 50 in the X direction. As this happens, transducer 54 moves along the vibrating structure 41 and produces a voltage the DC part of which is proportional to the distance from the structure to transducer 54. If the DC voltage produced by transducer instrumentation 55 varies from the voltage produced by DC offset 59, the difference voltage is applied through amplifier 58 and low-pass filter 60 to motor 52 which repositions transducer 54 so that the difference voltage becomes zero. Hence transducer 54 is always maintained at the same selected average distance from vibrating structure 41. The AC voltage at the output of operational amplifier 58 is applied to converter 61 and to phase detector 47. If the AC voltage at the output of operational amplifier 58 is in opposite phase with respect to the AC voltage at the output of AC amplifier 46, phase detector 47 produced a signal which actuates switching relay 62 to invert the output of converter 61 before it is applied to motor 53. If the AC voltage at the output of operational amplifier 58 is in phase with the AC voltage from AC amplifier 46, phase detector 47 produces a signal which actuates the switching relay 62 such that the output of converter 61 is unchanged before it is applied to motor 53. Since motor 53 has a recording pen connected to it, it makes the recording 63 which represents the deflection of vibrating structure 41 and also gives the phase information. That is, it tells whether or not the vibration is negative with respect to the vibrations opposite transducer 44.

This invention offers several advantages over prior art methods of measuring the deflection of vibrating structures. It provides a noncontacting vibrating structure deflection measuring device that has a constant sensitivity, that is not limited in the amplitudes of the vibrations measured and that does not require the use of profile guides.

What is claimed is:

1. An instrument for measuring the deflection of a vibrating structure comprising: noncontacting transducer instrumentation, including a transducer and converter which produces a voltage proportional to the distance between the transducer and a structure; means for moving said transducer along said vibrating structure; servomechanism means responsive to the voltage produced by said noncontacting transducer instrumentation for maintaining said transducer the same selected distance from said vibrating structure as the transducer moves along said vibrating structure; and means for measuring the output from said noncontacting transducer instrumentation whereby said measurement is a measurement of the deflection of said vibrating structure.

2. An instrument for measuring the deflection of a vibrating structure as claimed in claim 1 wherein said servomechanism means includes DS offset means for producing a fixed DC voltage that is negative with respect to the DC component of the voltage produced by the said noncontacting transducer instrumentation; means for summing the voltage produced by said DC offset means and said noncontacting transducer instrumentation; low-pass filter means for passing only the DC component of said summed voltage; and servomotor means for positioning said transducer in accordance with said filtered voltage.

3. An instrument for measuring the deflection of a vibrating structure comprising: an $XY_1Y_2$ recorder with the X direction of the recorder parallel to said vibrating structure; non contacting transducer instrumentation, including a transducer and converter, which produces a voltage proportional to the distance between the transducer and a structure; DC offset for producing a fixed DC voltage that is negative with respect to the DC component of the voltage produced by said noncontacting transducer instrumentation; means for summing the voltages produced by said noncontacting transducer instrumentation and said DC offset; means for applying the DC component of said summed voltage to one of the Y motors of said recorder that has said transducer connected to its shaft for maintain said transducer the same selected distance from said vibrating structure as said transducer moves along said vibrating structure; means, including the other Y motor of said recorder, for measuring the AC component of said summed voltage; and means for mounting said Y motors for movement in the X direction by an X motor whereby said measurement is a measurment of the deflection of said vibrating structure.

4. An instrument for measuring the deflection of a vibrating structure as claimed in claim 3 wherein said means for measuring the AC component of said summed voltage includes means for converting the AC component of said summed voltage to DC; phase detector means for comparing the phase of said summed voltage with a fixed AC voltage and for generating a signal indicating that the two voltages are either in phase or out of phase; and switching means receiving said signal for applying said converted AC component of said summed voltage to said other Y motor when the two compared voltages are in phase or for inverting said converted AC component of said summed voltage before it is applied to said other Y motor when the two compared voltages are out of phase.

5. An instrument for measuring the deflection of a vibrating structure as claimed in claim 4 wherein said fixed AC voltage is generated by a noncontacting transducer located a fixed distance from said vibrating structure.

6. An instrument for measuring the contour of a vibrating structure comprising: noncontacting transducer instrumentation, including a transducer and converter which produces a voltage proportional to the distance between the transducer and a structure; means for moving said transducer along said vibrating structure, servomechanism means for maintaining said transducer the same selected distance from said vibrating structure as the transducer moves along said vibrating structure; said servomechanism means includes a motor, a DC offset means for producing a fixed DC voltage that is negative with respect to the DC component of the voltage produced by said noncontacting transducer instrumentation; means for summing the voltage produced by said DC offset means and said noncontacting transducer instrumentation, rectifier filter means for rectifying said summed voltage and means for applying said rectified voltage to said motor; and means for measuring the output of said motor whereby said measurement is a measurement of the contour of said vibrating structure.

References Cited

UNITED STATES PATENTS

| | | | |
|---|---|---|---|
| 3,217,204 | 11/1965 | Nance | 314—71 |
| 3,263,167 | 7/1966 | Foster et al. | 324—61 |
| 3,316,756 | 5/1967 | Hickman | 73—71.4 |

CHARLES A. RUEHL, Primary Examiner